United States Patent
Baur et al.

(10) Patent No.: US 8,349,516 B2
(45) Date of Patent: Jan. 8, 2013

(54) SEAL ARRANGEMENT IN A FUEL CELL DEVICE

(75) Inventors: Thomas Baur, Weilheim (DE); Matthias Jesse, Dettingen (DE)

(73) Assignee: Daimler AG, Stuttgart (DE)

( * ) Notice: Subject to any disclaimer, the term of this patent is extended or adjusted under 35 U.S.C. 154(b) by 490 days.

(21) Appl. No.: 12/596,631

(22) PCT Filed: Apr. 23, 2008

(86) PCT No.: PCT/EP2008/003239
§ 371 (c)(1),
(2), (4) Date: Oct. 19, 2009

(87) PCT Pub. No.: WO2008/135163
PCT Pub. Date: Nov. 13, 2008

(65) Prior Publication Data
US 2010/0167173 A1 Jul. 1, 2010

(30) Foreign Application Priority Data

May 7, 2007 (DE) .......................... 10 2007 021 292

(51) Int. Cl.
*H01M 8/02* (2006.01)
*F16L 17/06* (2006.01)

(52) U.S. Cl. ........ 429/508; 429/509; 277/608; 277/614; 277/626

(58) Field of Classification Search .................... None
See application file for complete search history.

(56) References Cited

U.S. PATENT DOCUMENTS

| 3,918,725 | A | * | 11/1975 | Dryer | 277/612 |
| 6,857,638 | B2 | * | 2/2005 | Dupont et al. | 277/608 |
| 2002/0030326 | A1 | * | 3/2002 | Bettencourt | 277/602 |
| 2004/0151968 | A1 | | 8/2004 | Warrier et al. | |
| 2005/0181262 | A1 | | 8/2005 | Vanderleeden et al. | |
| 2005/0200128 | A1 | * | 9/2005 | Bongiorno | 285/364 |

FOREIGN PATENT DOCUMENTS

| DE | 603 01 036 T2 | 6/2006 |
| EP | 1 296 394 A1 | 3/2003 |
| JP | 2006-48936 A | 2/2006 |

OTHER PUBLICATIONS

International Search Report dated Nov. 7, 2008 (Form PCT/ISA/210), Written Opinion (Form PCT/ISA/237), and Form PCT/ISA/220 (Twelve (12) pages).

* cited by examiner

Primary Examiner — Jonathan Crepeau
(74) Attorney, Agent, or Firm — Crowell & Moring LLP

(57) ABSTRACT

A seal arrangement in a fuel cell device seals against leaks in a mechanical joint between two components which convey a liquid and/or a gaseous process medium 3 in a media chamber of the fuel cell device. The seal arrangement has a first sealing member which extends around the media chamber in an installed state, and is in active connection with the components. A second, surrounding sealing member is arranged facing away from the media relative to the first sealing member and is formed of a different material from the first sealing member and/or has a different geometry.

7 Claims, 1 Drawing Sheet

Fig. 1
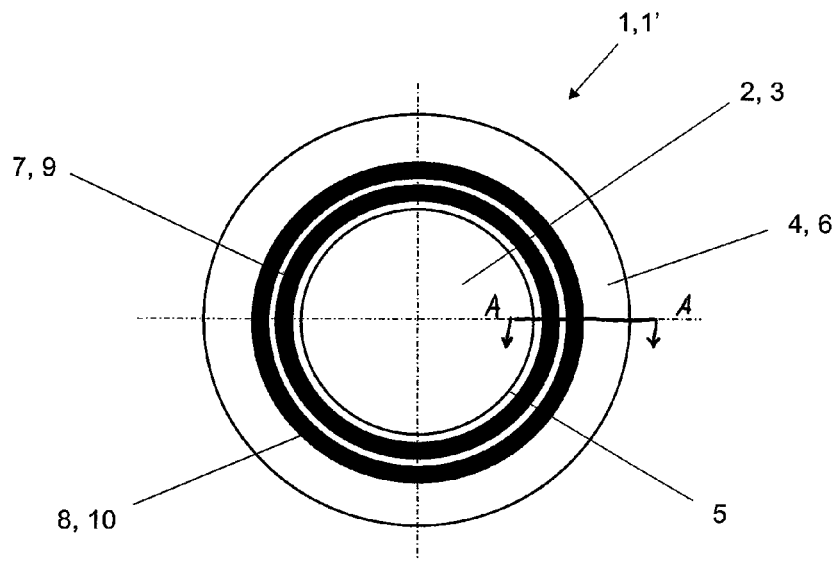
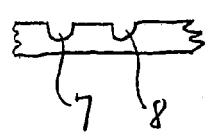
Fig. 1a
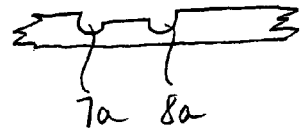
Fig. 1b
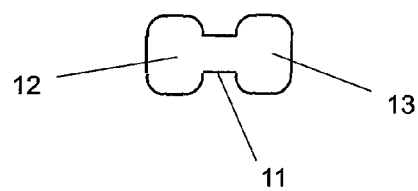
Fig. 2

SEAL ARRANGEMENT IN A FUEL CELL DEVICE

This application is a national stage of PCT International Application No. PCT/EP2008/003239, filed Apr. 23, 2008, which claims priority under 35 U.S.C. §119 to German Patent Application No. 102007021292.7, filed May 7, 2007, the entire disclosure of which is herein expressly incorporated by reference.

BACKGROUND AND SUMMARY OF THE INVENTION

The invention relates to a seal arrangement in a fuel cell device for sealing against leakage in a mechanical joint between two fuel cell components which convey a liquid and/or a gaseous process medium in a media chamber.

The seal arrangement according to the invention includes a sealing member which is constructed to extend around the media chamber and which is in active connection with the components. Such seal arrangements are needed, for example, to prevent the mechanical joints between fuel cell components that convey process media (such as, for example media lines) from leaking liquid or gaseous media or a mixture of liquid and gaseous process media from the fuel cell device into the surrounding environment.

In the electrochemical process in a fuel cell of a fuel cell device, a liquid or gaseous fuel (for example, hydrogen as one of the possible process media) is reacted, to generate electrical energy, with a further process medium (for example oxygen-containing ambient air) to yield process products, primarily water. To this end, the fuel cells comprise an anode and cathode arrangement with an interposed electrolyte, the electrolyte taking the form of a proton-conductive polymer membrane for example in the case of fuel cells for mobile use. The electrode layers of the anode and cathode arrangement, which are generally made of a porous, electrically conductive material, form with the polymer membrane a membrane/electrode assembly (MEA).

The above-stated seal arrangement is applied to the points at which the components conveying process media are joined together, for example, two joined-together line portions of an anode-side fuel supply or a cathode-side oxygen supply of the fuel cells. The seal arrangement may also be applied at the junction points of stack components of a fuel cell stack comprising a plurality of fuel cells. Thus, within the stack components the seal arrangement seals off, for example, areas around manifold channel portions which convey corresponding process media through the fuel cell stack; or it isolates joined-together plate elements of the stack housing in which the electrochemically active area of the MEA is enclosed.

German patent document DE 60301036 T2 discloses an integral, fluid-impermeable seal for an MEA in an electrochemical fuel cell, with a first and a second porous electrode layer and an ion exchange membrane arranged therebetween. The seal is constructed integrally with the MEA, being impregnated into sealing areas of the first and second porous electron layers, and comprising a rigid seal material. The sealing areas comprise the electrochemically active area of the MEA and optionally also openings within the MEA, for example manifold channel openings, the seal being constructed so as to surround the areas conveying media. The seal additionally comprises sealing means which project horizontally or vertically beyond the contours of the MEA. Thus, for example, one or more elevated ribs are described, which project beyond the main surface of the seal integral with the MEA. In addition, the seal comprises orienting means for assisting in orienting the MEA during assembly of the fuel cell. The sealing and/or orienting means of the seal may be formed of rigid or resilient sealing material, which is applied to the surface of the seal of integral construction. Examples of rigid sealing materials which are used for this purpose include Teflon (polytetrafluoroethylene) or thermoplastic fluoropolymers, such as polyvinyl fluoride or polyvinylidene fluoride, or poly(meth)acrylates, application being performed by injection moulding or coating. Known resilient sealing materials include injection-mouldable elastomer compositions, such as silicones, fluoroelastomers, fluororubber, ethylene-propylene(-diene) rubbers (EPM, EPDM) and natural rubber.

In the assembled state, the MEA of a fuel cell is enclosed on both sides of its porous electrode layers by two stack components of a fuel cell stack, namely the separator plates. In cooperation with the separator plates, the seal effects liquid-tight sealing of the MEA relative to the junction points of these stack components and thus leakage sealing of the stack housing. At the same time, the seal closes the outer lateral edges of the MEA and the lateral edges thereof directed towards the openings of the MEA in a liquid-tight manner, such that in this area no mixing of the operating media streams from the two sides of the MEA can take place. Over a given service life or useful life of the known fuel cell device with such seal arrangements under weather-dependent ambient conditions, increasing liquid or gas leaks at the mechanical joints between the components of the fuel cell device may be observed.

One object of the present invention is to improve the sealing properties of a seal arrangement in a fuel cell device for sealing a mechanical joint between two components of the fuel cell device.

This and other objects and advantages are achieved by the seal arrangement according to the invention, which is suitable for sealing off joints between components of a fuel cell device conveying process medium, such as for example line portions of media lines or stack components of a fuel cell stack, in which primarily a liquid/gas mixture acts as process medium with the involvement of water in the liquid or gaseous state. Thus, the fuel cell device, in particular such a device for motor vehicles, is operated on the anode side for example with a water vapour-containing hydrogen gas or on the cathode side with an air/water mixture.

The seal arrangement according to the invention is suitable and/or designed to enclose a media chamber of the components, in which chamber the process media are conveyed, at junction points of components with a surrounding sealing member, and to seal the media chamber off in cooperation with the components. For example, the media chamber may be the electrochemically active area of an MEA of a fuel cell together with the conveying cross sections of the media lines and manifold channels of the fuel cell device.

Temperature fluctuations in the area surrounding the place at which the fuel cell device is used or installed, together with a very wide dynamic range in output of the electrochemical process in the fuel cells of the fuel cell device itself (particularly motor vehicles) cause considerable variations in the physical characteristics of the process media, and also affect the characteristics of the materials of the sealing members of the seal arrangement. As a result, the sealing action deteriorates in the short and longer term. For instance, the process media may display temperatures within a wide temperature range from −40° C. to +90° C.; guaranteeing gas-tightness, for example relative to a hydrogen-containing process medium, is problematic over this wide temperature range using a sealing member of conventional sealing material, such as for example an O-ring of silicone.

In particular where ambient temperatures of below 0° C. arise at the place of use or installation, the water fraction in the process media may condense and freeze, leading to icing, for example when the fuel cell device is idle. This in turn causes considerable mechanical stresses on the generally soft resilient sealing material of the sealing member.

Under these operating conditions, and with the various states of the process media, the seal arrangement of the fuel cell arrangement is subject to particularly stringent demands with regard to reliable sealing action.

Accordingly, the sealing arrangement according to the invention provides a second, surrounding, sealing member, which is arranged facing away from the media relative to the first sealing member and is of a different material from the first sealing member and/or has a different geometry.

The invention is based on the proposition that different sealing members, which have different sealing material characteristics and different geometry, achieve different sealing actions, such that, if they are applied in combination, impermeability may be ensured over wide ranges of the sealing requirements arising within the operating area of the fuel cell device. Furthermore, it is thus possible to guarantee reliable seal with respect to both liquids and gaseous media. As a result, a higher level of tightness is achieved over a wider range of media characteristics and temperatures than with the conventional seal arrangements. In this way also, two, or optionally more, seal lines are formed.

In a preferred further embodiment of the invention, the material and/or the geometry of the first sealing member is such that the first sealing member provides a liquid seal, while the material and/or geometry of the second sealing member are such that the second sealing member provides a gas seal.

In the embodiment according to the invention, a first sealing member, which faces the media and is thus arranged in direct contact with the media, seals off the mechanical joint between the components primarily against the water fraction in the process medium. It thus protects the second sealing member facing away from the media relative to the first sealing member, which is thus in only indirect contact with the media, against the effects of the moisture in the process medium. This second sealing member, unaffected by moisture, may be designed specially to meet the stringent sealing requirement with regard to gas-tightness, for example hydrogen-tightness.

In a further preferred embodiment of the invention, the material of the first sealing member has a higher hardness then the material of the second sealing member. The material with a higher hardness has proven more resistant to temperature fluctuations and mechanical stresses caused by ice crystals from the process medium. Thus, the first sealing member, which is in direct contact with the media, provides a particularly robust protective barrier for protecting the second seal from mechanical stress, while the second sealing member may be made from softer material to achieve a higher gas tightness. Preferably, the first sealing member is made from a rigid material and the second sealing member from a resilient material. In this respect, it is of no importance which particular rigid and resilient sealing materials are specifically selected, since the invention lies in the difference between the material characteristics of the sealing members used. The appropriate materials may be selected in an application-specific manner according to the invention by a person skilled in the relevant technology. In this respect, temperature, pressure and media composition determine which material is selected as suitable.

In one particular embodiment, the first and/or the second sealing member may have a substantially square cross-section along its periphery.

In a further particular embodiment, the first and/or the second sealing member may have a substantially round or oval cross section along its periphery.

Furthermore, it is advantageous for the first and/or the second sealing member to comprise at least one sealing lip. Sealing lips form a partial projection, extending preferably along the sealing member, beyond a basic shape of the sealing member. In this way, the necessary active connection between the sealing member and the joint faces of the components is more reliably ensured. A plurality of sealing lips additionally increase security against leakiness, since any damage done to a sealing lip does not endanger the impermeability of the entire sealing member.

To achieve a uniform sealing action of the seal arrangement over the entire circumference of the media chamber, the first and second sealing members are preferably arranged parallel but at a distance from one another.

In an embodiment which is technologically favourable for the provision of the seal arrangement according to the invention, the first and second sealing members are connected together, preferably by means of a connecting web. The sealing members connected in this way may be positioned precisely between the components in one operation during assembly of the mechanical joint despite their different construction according to the invention. The connecting web provides a shape and/or material transition between the first and second sealing members.

Furthermore, it is advantageous for the components to comprise matching joint faces, the joint face of the one component and/or the joint face of the other component comprising a recess for accommodating the first and/or second sealing members and/or the connecting web. The sealing members may be inserted in individual or combined configuration into the correspondingly shaped recess and may thus be fixed precisely in position. Fixing ensures optimum seating of the sealing member both in the preparation phase prior to assembly of the mechanical joint between the two components, and in the final assembled state of the mechanical joint, which on the one hand simplifies handling of the seal arrangement according to the invention and on the other hand increases the reliability of leakage sealing of the mechanical joint.

In one advantageous embodiment of the seal arrangement according to the invention, the components are line portions of a media line, each line portion comprising a flange with a flange face constructed as a joint face.

BRIEF DESCRIPTION OF THE DRAWINGS

FIG. 1 is a view of a flange face of a line portion in a fuel cell device with a seal arrangement according to a first exemplary embodiment of the invention;

FIGS. 1a and 1b are schematic cross sectional illustrations taken along line A-A in FIG. 1, for alternative embodiments of the invention; and FIG. 2 is a sectional representation of two sealing members connected by a connecting web of a seal arrangement in accordance with a second exemplary embodiment.

DETAILED DESCRIPTION OF THE DRAWINGS

FIG. 1 shows a line portion 1' of a media line 1 in a fuel cell device (not shown in any more detail). The media line 1, which is composed of one or more line portions 1', forms a media chamber 2 with a circular media-conveying cross section, which conveys a process medium 3 (for example a hydrogen/water mixture) involved in the electrochemical process of the fuel cell device. The illustration in FIG. 1 shows the end face of the line portion 1', on which a flange 4 is formed. The flange 4 surrounds a line opening 5 of the media chamber 2 in the media line, and serves to produce a flanged joint between the line portion 1' and a further component of the fuel cell device (not shown), which may for example be a further line portion associated with the line portion 1', of the media line 1 or a tank connecting piece of a media collecting tank. The flange 4 comprises a flange face 6, which takes the form of a joint face that fits together in the flanged joint with a joint face of the component that is to be connected thereto. On the flange face 6 there are formed two surrounding recesses 7, 8 each for accommodating an annularly extending sealing member 9, 10. (See FIG. 1a.)

The sealing members 9, 10 are arranged coaxially with and parallel to one another about the line opening 5 in the line portion 1'. The first sealing member 9 is mounted facing the media chamber 2, while the second sealing member 10 surrounds the first sealing member 9 is facing away from the media. With this arrangement, the first sealing member 9 in direct contact with the media, while the second sealing member 10 is in indirect contact with the media. In the exemplary embodiment, the first sealing member 9 has a square cross section, and may also be called a quad ring. The second sealing member 10 has a round cross section and is therefore also known as an O-ring. The two sealing members 9, 10 are made of a resilient material, such as for example of fluororubber.

On final assembly of the mechanical joint between the line portion 1' and the associated line portion of the fuel cell device, the sealing members 9, 10 fit together under a given contact pressure with the joint face of an associated line portion. The quad ring has particularly good sealing properties, due to more favourable pressure distribution over its square cross section than is displayed by an O-ring. Thus, the first sealing member 9, facing the media, is suitable for primary fluid sealing in a first sealing stage. That is, it seals the mechanical joint above all against the liquid water fraction of the process medium 3. Thus, the second sealing member 10, facing away from the media, is protected against the action of water from the process medium 3, particularly against mechanical damage caused by ice crystals at low temperatures of the process medium 3. The second sealing member 10 consequently has a specific gas-sealing effect in a second, secondary sealing stage relative to the gaseous hydrogen content of the process medium 3, which has penetrated as a residual leakage flow through the primary sealing stage of the first sealing member 9.

FIG. 2 is a cross-sectional view of two sealing members 12, 13, connected by means of a connecting web 11, of a second exemplary embodiment of the seal arrangement. The combination of the sealing members 12, 13 may alternatively be provided in the flanged joint of the line portion 1' according to FIG. 1, wherein the combination of the sealing members 12, 13 is likewise of annularly extending construction, and is integrated into a correspondingly shaped, surrounding recess 7a-8a (FIG. 1.b) such that the first sealing member 12 faces the media and the second sealing member 13 faces away from the media. The sealing members 12, 13 each have a substantially square cross section (quad ring), the first sealing member 12 being formed of a rigid sealing material (such as, for example, a thermoplastic fluoropolymer), and the second sealing member 13 being formed of a resilient material (such as, for example, fluororubber). The rigid material has proven more resistant to temperature fluctuations and mechanical stresses caused by ice crystals from the water content of the process medium 3, such that here too the first sealing member 12 directly in contact with the media is suitable for primary liquid sealing in the first sealing stage.

The combination of the two sealing members 12, 13 is produced from an injection moulding using a known technologically favourable method of manufacture. The connecting web 11 ensures that the two sealing members 12, 13 are fixed in position relative to one another and brings about the material transition. This combination of the sealing members 12, 13 is particularly easy to handle during final assembly of the flanged joint between the line portion 1' and the associated line portion.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A seal arrangement for sealing a mechanical joint between two components of a fuel cell device, which components convey a fluid process medium in a media chamber; said arrangement comprising:
   a first sealing member which is configured to extend around the media chamber in an installed state, in active connection with the components, wherein the first sealing member has an inner side facing the media chamber and an outer side facing away from the media chamber and the first sealing member is a quad ring with a substantially square cross-section; and
   a second sealing member having an inner side that radially surrounds the outer side of the first sealing member, wherein the second sealing member is an O-ring with a substantially round cross-section, wherein
      one of material and the geometry of the first sealing member is such that the first sealing member provides a liquid seal;
      one of the material and geometry of the second sealing member is such that the second sealing member provides a gas seal; and
      the material of the first sealing member has a hardness that is greater than a hardness of the material of the second sealing member.

2. The seal arrangement according to claim 1, wherein:
   the first sealing member is made from a rigid material; and
   the second sealing member from a resilient material.

3. The seal arrangement according to claim 1, wherein at least one of the first and second sealing members comprises at least one sealing lip.

4. The seal arrangement according to claim 1, wherein the first and second sealing members are arranged parallel, but at a distance from one another.

5. The seal arrangement according to claim 1, wherein:
   the components are line portions of a media line; and
   each line portion comprising a flange with a peripheral flange for forming a joint face.

6. The seal arrangement according to claim 5, wherein one of the first and second sealing members is arranged coaxially about a line opening of the line portion.

7. A seal arrangement for sealing a mechanical joint between two components of a fuel cell device, which components convey a fluid process medium in a media chamber; said arrangement comprising:

a first sealing member which is configured to extend around the media chamber in an installed state, in active connection with the components, wherein the first sealing member has an inner side facing the media chamber and an outer side facing away from the media chamber and the first sealing member is a quad ring with a substantially square cross-section; and a second sealing member having an inner side that radially surrounds the outer side of the first sealing member, wherein the second sealing member is an O-ring with a substantially round cross-section, wherein
the first and second sealing members are connected together by a connecting web having a cross-sectional shape that is different from the cross-sectional shapes of the first and second sealing members;

the components have matching joint faces;

the joint face of at least one of the components has a recess for accommodating at least one of the first and second sealing members; and said joint face of at least one of the components further comprises a recess for accommodating the connecting web.

* * * * *